(12) United States Patent
Ma et al.

(10) Patent No.: US 12,512,770 B2
(45) Date of Patent: Dec. 30, 2025

(54) SELF-CHARGING DROPLET CAPACITOR FOR HARVESTING LOW-LEVEL AMBIENT ENERGY

(71) Applicant: UNIVERSITY OF HAWAI'I, Honolulu, HI (US)

(72) Inventors: Tianwei Ma, Honolulu, HI (US); Jian Yu, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 614 days.

(21) Appl. No.: 17/921,537

(22) PCT Filed: Apr. 30, 2021

(86) PCT No.: PCT/US2021/030139
§ 371 (c)(1),
(2) Date: Oct. 26, 2022

(87) PCT Pub. No.: WO2021/222731
PCT Pub. Date: Nov. 4, 2021

(65) Prior Publication Data
US 2023/0188056 A1   Jun. 15, 2023

Related U.S. Application Data

(60) Provisional application No. 63/017,822, filed on Apr. 30, 2020.

(51) Int. Cl.
*H02N 1/08* (2006.01)
*H01G 4/06* (2006.01)
(Continued)

(52) U.S. Cl.
CPC ............... *H02N 1/08* (2013.01); *H01G 4/06* (2013.01); *H01G 4/228* (2013.01); *H02J 7/342* (2020.01); *H02J 7/345* (2013.01)

(58) Field of Classification Search
CPC .. H02N 1/08; H01G 4/06; H01G 4/228; H02J 7/342; H02J 7/345
(Continued)

(56) References Cited

U.S. PATENT DOCUMENTS

| | | | |
|---|---|---|---|
| 6,274,224 B1 * | 8/2001 | O'Bryan | H05K 1/162 428/209 |
| 7,898,096 B1 * | 3/2011 | Krupenkin | H02N 1/08 290/1 R |

(Continued)

FOREIGN PATENT DOCUMENTS

| | | |
|---|---|---|
| JP | 2012023839 A | 2/2012 |
| JP | 2013172605 A | 9/2013 |

(Continued)

OTHER PUBLICATIONS

Li, S. et al., "Manipulating the triboelectric surface charge density of polymers by low-energy helium ion irradiation/implantation," Energy & Environmental Science, vol. 13, No. 2, Dec. 2019, 12 pages.

(Continued)

*Primary Examiner* — M Baye Diao
(74) *Attorney, Agent, or Firm* — Withrow & Terranova, PLLC; Vincent K. Gustafson

(57) ABSTRACT

A self-charging droplet capacitor for harvesting low-level ambient energy is provided. The capacitor includes a conductive liquid droplet, which is placed on a heterogeneous and hydrophobic surface of dielectric materials coated onto a conductive substrate. The substrate and the droplet, along with the dielectric materials in between, form a parallel-plate type capacitor. The droplet is free to move on the surface, and thus, provides a position-dependent variation of capacitance. The surface consists of two regions, each with a different material and thickness. The different strengths of solid-water contact electrification of the two materials give (Continued)

rise to a self-charging mechanism. The variation in thickness allows for the capacitance change required for energy harvesting.

12 Claims, 10 Drawing Sheets

(51) Int. Cl.
  *H01G 4/228* (2006.01)
  *H02J 7/34* (2006.01)
(58) Field of Classification Search
  USPC .......................................................... 320/166
  See application file for complete search history.

(56) References Cited

U.S. PATENT DOCUMENTS

| | | | |
|---|---|---|---|
| 8,858,772 B2* | 10/2014 | Crane ................... | G02B 26/005 |
| | | | 204/600 |
| 10,020,125 B1* | 7/2018 | Phillips ..................... | H01B 3/10 |
| 10,369,570 B2* | 8/2019 | Hadwen ............ | B01L 3/502715 |
| 10,439,405 B2* | 10/2019 | Kawamura ............... | B60L 3/12 |
| 10,826,301 B2* | 11/2020 | Li ........................... | H02J 7/345 |
| 10,848,079 B2 | 11/2020 | Ma et al. | |
| 10,873,276 B2 | 12/2020 | Ma et al. | |
| 10,910,869 B2* | 2/2021 | Rosso ..................... | H02M 3/07 |
| 2002/0093313 A1* | 7/2002 | Hoffmann ........... | F02D 41/2096 |
| | | | 320/166 |
| 2008/0048521 A1 | 2/2008 | Mabuchi et al. | |
| 2010/0295415 A1 | 11/2010 | Despesse et al. | |
| 2010/0301699 A1 | 12/2010 | Zhang | |
| 2012/0274134 A1 | 11/2012 | Gasparini et al. | |
| 2013/0229087 A1 | 9/2013 | Hayashi et al. | |
| 2013/0229157 A1* | 9/2013 | Carver ..................... | H01G 4/38 |
| | | | 320/166 |
| 2014/0296687 A1* | 10/2014 | Irazoqui ................... | A61B 3/16 |
| | | | 600/398 |
| 2015/0077071 A1 | 3/2015 | Fleming | |
| 2015/0123513 A1 | 5/2015 | Kim et al. | |
| 2016/0040648 A1 | 2/2016 | Wang et al. | |
| 2018/0316280 A1 | 11/2018 | Niu et al. | |
| 2019/0280620 A1 | 9/2019 | Ma et al. | |
| 2019/0280621 A1* | 9/2019 | Ma .......................... | H02N 1/08 |

FOREIGN PATENT DOCUMENTS

| | | |
|---|---|---|
| JP | 2015039258 A | 2/2015 |
| KR | 1020160057912 A | 5/2015 |
| WO | 2015071345 A1 | 5/2015 |
| WO | 2018094256 A1 | 5/2018 |
| WO | 2020263800 A1 | 12/2020 |
| WO | 2021222731 A1 | 11/2021 |

OTHER PUBLICATIONS

Lin, Z-H. et al., "Harvesting Water Drop Energy by a Sequential Contact-Electrification and Electrostatic-Induction Process", Advanced Materials, May 2014, vol. 26, No. 27, pp. 4690-4696 <DOI:10.1002/adma.201400373>.

Liu, M. et al., "Large-Area All-Textile Pressure Sensors for Monitoring Human Motion and Physiological Signals," Advanced Materials, vol. 29, No. 41, Sep. 2017, 9 pages.

Mahmud, M.A. et al., "Recent Advances in Nanogenerator-Driven Self-Powered Implantable Biomedical Devices," Advanced Energy Materials, vol. 8, Issue 2, Jan. 2018, first published Sep. 2017, WILEY-VCH Verlag GmbH & Co., 25 pages.

Milijkovic, N. et al., "Jumping-droplet electrostatic energy harvesting," Applied Physics Letters, vol. 105, Issue 1, Jul. 2014, 27 pages.

Moon, J. et al., "Electrical power generation by mechanically modulating electrical double layers", Nature Communications, Feb. 2013, vol. 4, article 1487, 6 pages <DOI:10.1038/ncomms2485>.

Nie, J. et al., "Power generation from the interaction of a liquid droplet and a liquid membrane," Nature Communications, vol. 10, May 2019, 10 pages.

Nie, J. et al., "Probing Contact-Electrification-Induced Electron and Ion Transfers at a Liquid-Solid Interface," Advanced Materials, vol. 32, Issue 2, Jan. 2020, first published Nov. 2019, WILEY-VCH Verlag GmbH & Co., 11 pages.

Oishi, E. et al., "The Effect of the Terminal Functional Groups on Fluoropolymer on Electrowetting Device Performance," Technologies, vol. 7, Issue 3, Jul. 2019, MDPI, 9 pages.

Paradiso, J.A. et al., "Energy Scavenging for Mobile and Wireless Electronics," IEEE Pervasive Computing, vol. 4, Issue 1, Jan.-Mar. 2005, IEEE, 10 pages.

Priya, S. et al., "A Review on Piezoelectric Energy Harvesting: Materials, Methods, and Circuits," Energy Harvesting and Systems, vol. 4, Issue 1, Feb. 2017, 37 pages.

Roundy, S. et al., "A planar electromagnetic energy harvesting transducer using a multi-pole magnetic plate," Sensors and Actuators A: Physical, vol. 195, Jun. 2013, Elsevier, pp. 98-104.

Roundy, S. et al., "A study of low level vibrations as a power source for wireless sensor nodes," Computer Communications, vol. 26, Issue 11, Jul. 2003, Elsevier Science B.V., pp. 1131-1144.

Suzuki, Y. et al., "A MEMS electret generator with electrostatic levitation for vibration-driven energy-harvesting applications," Journal of Micromechanics and Microengineering, vol. 20, No. 10, Sep. 2010, IOP Publishing Ltd., 9 pages.

Suzuki, Y., "Recent progress in mems electret generator for energy harvesting," IEEJ Transactions on Electrical and Electronic Engineering, vol. 6, No. 2, Mar. 2011, first published Jan. 2011, pp. 101-111.

Tang, W. et al., "Recent Progress in Power Generation from Water/Liquid Droplet Interaction with Solid Surfaces," Advanced Functional Materials, vol. 29, Issue 41, Oct. 2019, first published Mar. 2019, 13 pages.

Torres, E. et al., "A 0.7-μ m BiCMOS Electrostatic Energy-Harvesting System IC," IEEE Journal of Solid-State Circuits, vol. 45, No. 2, Feb. 2010, 31 pages.

Wang, Z.L. et al., "On the origin of contact-electrification," Materials Today, vol. 30, Nov. 2019, 18 pages.

Wang, J. et al., "Self-Powered Wind Sensor System for Detecting Wind Speed and Direction Based on a Triboelectric Nanogenerator," ACS Nano, vol. 12, No. 4, Mar. 2018, 10 pages.

Wei, C. et al., "A comprehensive review on vibration energy harvesting: Modelling and realization," Renewable and Sustainable Energy Reviews, vol. 74, Jul. 2017, first published Feb. 2017, Elsevier Ltd., 18 pages.

Xu, W. et al., "A droplet-based electricity generator with high instantaneous power density," Nature, vol. 578, Feb. 2020, 16 pages.

Yang, Z. et al., "Power generation from conductive droplet sliding on electret film," Applied Physics Letters, vol. 100, No. 21, May 2012, AIP Publishing, 4 pages.

Yen, B.C. et al., "A variable-capacitance vibration-to-electric energy harvester," IEEE Transactions on Circuits and Systems I: Regular Papers, vol. 53, Issue 2, Feb. 2006, pp. 288-295.

Yin, J. et al., "Generating electricity by moving a droplet of ionic liquid along graphene", Nature Nanotechnology, Apr. 2014, vol. 9, pp. 378-383 <DOI:10.1038/nnano.2014.56>.

Yu, J. et al., "Exponential energy harvesting through repetitive reconfigurations of a system of capacitors", Communications Physics, Mar. 2018, vol. 1, No. 9, 10 pages <DOI:10.1038/s42005-018-0010-y>.

Yu, J. et al., "Harvesting energy from low-frequency excitations through alternate contacts between water and two dielectric materials", Scientific Reports, Dec. 2017, vol. 7, article 17145, 9 pages <DOI:10.1038/s41598-017-17522-8>.

Zhang, H.L. et al., "Concentrated solar power plants: Review and design methodology," Renewable and Sustainable Energy Reviews, vol. 22, Issue C, Jun. 2013, pp. 466-481.

Zhu, G. et al., "Triboelectric-generator-driven pulse electrodeposition for micropatterning," Nano Letters, vol. 12, No. 9, Aug. 2012, ACS Publications.

(56) References Cited

OTHER PUBLICATIONS

Notice of Allowance for U.S. Appl. No. 16/346,676, mailed Aug. 6, 2020, 9 pages.
Notice of Allowance for U.S. Appl. No. 16/346,679, mailed Jul. 24, 2020, 9 pages.
International Search Report and Written Opinion for International Patent Application No. PCT/US2017/062378, mailed Mar. 12, 2018, 9 pages.
International Search Report and Written Opinion for International Patent Application No. PCT/US2017/063726, mailed Mar. 12, 2018, 9 pages.
International Search Report and Written Opinion for International Patent Application No. PCT/US2021/030139, mailed Aug. 10, 2021, 8 pages.
Achilli, A. et al., "Power generation with pressure retarded osmosis: An experimental and theoretical investigation", Journal of Membrane Science, Nov. 2009 (available online Jul. 2009), vol. 343, No. 1-2, pp. 42-52 <DOI:10.1016/j.memsci.2009.07.006>.
AGC, "Amorphous Fluoropolymer", AGC Chemicals: Chemistry for a Blue Planet, Jul. 2015, 19 pages.
Amin, M. et al., "Advanced Faraday cage measurements of charge and open-circuit voltage using water dielectrics", Journal of Electrostatics, Jul. 2006, vol. 64, No. 7-9, pp. 424-430 <DOI:10.1016/j.elstat.2005.10.020>.
Arnold, D., "Review of microscale magnetic power generation", IEEE Transactions in Magnetics, Nov. 2007 (date of publication: Oct. 2007), vol. 43, No. 11, pp. 3940-3951 <DOI:10.1109/TMAG.2007.906150>.
Baytekin, H. et al., "The Mosaic of Surface Charge in Contact Electrification", Science, Jul. 2011, vol. 333, No. 6040, pp. 308-312 <DOI:10.1126/science.1201512>.
Beeby, S. et al., "A micro electromagnetic generator for vibration energy harvesting", Journal of Micromechanics and Microengineering, Jun. 2007, vol. 17, No. 7, pp. 12577-1265 <DOI:10.1088/0960-1317/17/7/007>.
Beeby, S. et al., "Energy harvesting vibration sources for microsystems applications", Measurement Science and Technology, Oct. 2006, vol. 17, pp. R175-R195 <DOI:10.1088/0957-0233/17/12/R01>.
Bell, L., "Cooling, Heating, Generating Power, and Recovering Waste Heat with Thermoelectric Systems", Science, Sep. 2008, vol. 321, No. 5895, pp. 1457-1461 <DOI:10.1126/science.1158899>.
Boisseau, S. et al., "Electrostatic Conversion for Vibration Energy Harvesting", Small-Scale Energy Harvesting, Oct. 2012, Ch. 5, pp. 91-134 <DOI:10.5772/51360>.
Bowen, C. et al., "Piezoelectric and ferroelectric materials and structures for energy harvesting applications", Energy & Environmental Science, Nov. 2013, vol. 7, No. 1, pp. 25-44 <DOI:10.1039/C3EE42454E>.
Brogioli, D., "Extracting Renewable Energy from a Salinity Difference Using a Capacitor", Physical Review Letters, Jul. 2009, vol. 103, article 058501, 4 pages <DOI:10.1103/PhysRevLett.103.058501>.
Brownjohn, J. et al., "Ambient vibration survey of the bosporus suspension bridge", Earthquake Engineering and Structural Dynamics, Feb. 1989, vol. 18, No. 2, pp. 263-283 <DOI:10.1002/eqe.4290180210>.
Calió, R. et al., "Piezoelectric Energy Harvesting Solutions", Sensors, Mar. 2014, vol. 14, No. 3, pp. 4755-4790 <DOI:10.3390/s140304755>.
Chae, J. et al., "Optimum thickness of hydrophobic layer for operating voltage reduction in EWOD systems", Sensors and Actuators A: Physical, Aug. 2014, vol. 215, pp. 8-16 <DOI:10.1016/j.sna.2013.11.001>.
Choi, D. et al., "A smart pipet tip: Triboelectricity and thermoelectricity assisted in situ evaluation of electrolyte concentration", Nano Energy, Aug. 2017 (available online Jun. 2017), vol. 38, pp. 419-427 <DOI:10.1016/j.nanoen.2017.06.020>.
Cognet, V. et al., "Bioinspired turbine blades offer new perspectives for wind energy", Proceedings of the Royal Society A, Feb. 2017, vol. 473, No. 2198, 13 pages <DOI:10.1098/rspa.2016.0726>.
Conway, B. et al., "The role and utilization of pseudocapacitance for energy storage by supercapacitors", Journal of Power Sources, May-Jun. 1997, vol. 66, No. 1-2, pp. 1-14 <DOI:10.1016/S0378-7753(96)02474-3>.
Conway, B., "Transition from 'Supercapacitor' to 'Battery' behavior in electrochemical energy storage", Journal of the Electrochemical Society, Jun. 1991, vol. 138, No. 6, pp. 1539-1548 <DOI:10.1149/1.2085829>.
Cuadras, A. et al., "Thermal energy harvesting through pyroelectricity", Sensors and Actuators A: Physical, Mar. 2010 (available online Jan. 2010), vol. 158, No. 1, pp. 132-139 <DOI:10.1016/j.sna.2009.12.018>.
Disalvo, F., "Thermoelectric Cooling and Power Generation", Science, Jul. 1999, vol. 285, No. 5428, pp. 703-706 <DOI:10.1126/science.285.5428.703>.
Donelan, J. et al., "Biomechanical Energy Harvesting: Generating Electricity During Walking with Minimal User Effort", Science, Feb. 2008, vol. 319, No. 5864, pp. 807-810 <DOI:10.1126/science.1149860>.
Erturk, A. et al., "An experimentally validated bimorph cantilever model for piezoelectric energy harvesting from base excitations", Smart Materials and Structures, Jan. 2009, vol. 18, No. 2, article 025009, 18 pages <DOI:10.1088/0964-1726/18/2/025009>.
Fahrenbruch, A. et al., "Fundamentals of solar cells: photovoltaic solar energy conversion", Elsevier (New York), 1983, Ch. 1, pp. 1-25.
Firestone, F., "A new analogy between mechanical and electrical systems", The Journal of the Acoustical Society of America, 1933 (published online Jun. 2005), vol. 4, pp. 248-267 <DOI:10.1121/1.1915605>.
Grätzel, M., "Photoelectrochemical cells", Nature, Nov. 2001, vol. 414, pp. 338-344 <DOI:10.1038/35104607>.
Guigon, R. et al., "Harvesting raindrop energy: experimental study", Smart Materials and Structures, Jan. 2008, vol. 17, article 015039, 6 pages <DOI:10.1088/0964-1726/17/01/015039>.
Guigon, R. et al., "Harvesting raindrop energy: theory", Smart Materials and Structures, Jan. 2008, vol. 17, article 015038, 8 pages <DOI:10.1088/0964-1726/17/01/015038>.
Halvorsen, E., "Fundamental issues in nonlinear wideband-vibration energy harvesting", Physical Review E, 2013, vol. 87, article 042129, 6 pages <DOI:10.1103/PhysRevE.87.042129>.
Helseth, L. et al., "Contact Electrification and Energy Harvesting Using Periodically Contacted and Squeezed Water Droplets", Langmuir, Mar. 2015, vol. 31, No. 10, pp. 3269-3276 <DOI:10.1021/la503494c>.
Heremans, J., "Thermoelectricity: The ugly duckling", Nature, Apr. 2014, vol. 508, pp. 327-328 <DOI:10.1038/508327a>.
Horn, R. et al., "Contact Electrification and Adhesion Between Dissimilar Materials", Science, Apr. 1992, vol. 256, No. 5055, pp. 362-364 <DOI:10.1126/science.256.5055.362>.
Horn, R. et al., "Contact electrification induced by monolayer modification of a surface and relation to acid-base interactions", Nature, Dec. 1993, vol. 366, pp. 442-443 <DOI:10.1038/366442a0>.
Hunter, R. et al., "Foundations of Colloid Science", Clarendon Press, Feb. 1987, Ch. 6, pp. 316-391.
Hwang, G-T. et al., "Self-Powered Cardiac Pacemaker Enabled by Flexible Single Crystalline PMN-PT Piezoelectric Energy Harvester", Advanced Materials, Apr. 2014, vol. 26, No. 28, pp. 4880-4887 <DOI:10.1002/adma.201400562>.
Jeon, S-B. et al., "3-Dimensional broadband energy harvester based on internal hydrodynamic oscillation with a package structure", Nano Energy, Oct. 2015, vol. 17, pp. 82-90 <DOI:10.1016/j.nanoen.2015.08.002>.
Karami, M. et al., "Powering pacemakers from heartbeat vibrations using linear and nonlinear energy harvesters", Applied Physics Letters, Jan. 2012, vol. 100, article 042901, 5 pages <DOI:10.1063/1.3679102>.
Kilaru, M. et al., "Strong charge trapping and bistable electrowetting on nanocomposite fluoropolymer: BaTiO3 dielectrics", Applied Physics Letters, May 2007, vol. 90, article 212906, 4 pages <DOI:10.1063/1.2743388>.

(56) References Cited

OTHER PUBLICATIONS

Klarman, D. et al., "A Model of Electrowetting, Reversed Electrowetting, and Contact Angle Saturation", Langmuir, Apr. 2011, vol. 27, No. 10, pp. 6031-6041 <DOI:10.1021/la2004326>.
Koka, A. et al., "Vertically aligned BaTiO3 nanowire arrays for energy harvesting", Energy & Environmental Science, 2014 (published online Oct. 2013), vol. 7, No. 1, pp. 288-296 <DOI:10.1039/C3EE42540A>.
Krupenkin, T. et al., "Reverse electrowetting as a new approach to high-power energy harvesting", Nature Communications, Aug. 2011, vol. 2, No. 448, 8 pages <DOI:10.1038/ncomms1454>.
La Mantia, F. et al., "Batteries for Efficient Energy Extraction from a Water Salinity Difference", Nano Letters, Mar. 2011, vol. 11, No. 4, pp. 1810-1813 <DOI:10.1021/nl200500s>.
Lee, S. et al., "An electrochemical system for efficiently harvesting low-grade heat energy", Nature Communications, May 2014, vol. 5, No. 3942, 6 pages <DOI:10.1038/ncomms4942>.
Li, Q. et al., "Temperature Dependence of Electrical Properties and Crystal Structure of 0.29Pb(In1/2Nb1/2)O3-0.44Pb(Mg1/3Nb2/3)O3-0.27PbTiO3 Single Crystals", Advances in Condensed Matter Physics, Oct. 2013, vol. 2013, article 382140, 5 pages <DOI:10.1155/2013/382140>.
Li, X. et al., "Hydroelectric generator from transparent flexible zinc oxide nanofilms", Nano Energy, Feb. 2017, vol. 32, pp. 125-129 <DOI:10.1016/j.nanoen.2016.11.050>.
Liliestam, J. et al., "Empirically observed learning rates for concentrating solar power and their responses to regime change", Nature Energy, Jun. 2017, vol. 2, No. 17094, 9 pages <DOI:10.1038/nenergy.2017.94>.
Lin, J-H. et al., "Single- and few-layers MoS2 nanocomposite as piezo-catalyst in dark and self-powered active sensor", Nano Energy, Jan. 2017, vol. 31, pp. 575-581 <DOI:10.1016/j.nanoen.2016.12.013>.
Lin, Z-H. et al., "Water-Solid Surface Contact Electrification and its Use for Harvesting Liquid-Wave Energy", Angewandte Chemie, Nov. 2013, vol. 52, No. 48, pp. 12545-12549 <DOI:10.1002/anie.201307249>.
Lowell, J. et al., "Contact Electrification", Advances in Physics, 1980 (published online Jul. 2006), vol. 29, No. 6, pp. 947-1023 <DOI:10.1080/00018738000101466>.
Ma, T. et al., "Reaping the potentials of nonlinear energy harvesting with tunable damping and modulation of the forcing functions", Applied Physics Letters, May 2014, vol. 104, article 214104, 5 pages <DOI:10.1063/1.4879846>.
Li, C. et al., "Overview of Different Wind Generator Systems and Their Comparisons," IET Renewable Power Generation, vol. 2, No. 2, Jun. 2008, pp. 123-138.
Kwak, S.S. et al., "Butylated melamine formaldehyde as a durable and highly positive friction layer for stable, high output triboelectric nanogenerators," Energy & Environmental Science, vol. 12, No. 10, Sep. 2019, Royal Society of Chemistry, 8 pages.
Khan, F.U. et al., "State-of-the-art in vibration-based electrostatic energy harvesting," Journal of Micromechanics and Microengineering, vol. 26, No. 10, Sep. 2016, 29 pages.
Jiang, D. et al., "Water-solid triboelectric nanogenerators: An alternative means for harvesting hydropower," Renewable and Sustainable Energy Reviews, vol. 115, Nov. 2019, Elsevier Ltd., 16 pages.
Fan, F.R. et al., "Flexible Nanogenerators for Energy Harvesting and Self-Powered Electronics," Advanced Materials, vol. 28, Issue 22, Jun. 2016, WILEY-VCH Verlag Gmbh & Co., 23 pages.
Banpurkar, A. et al., "Spontaneous electrification of fluoropolymer-water interfaces probed by electrowetting," Faraday Discussions, vol. 199, No. 29, Jun. 2017, 19 pages.
Bai, P. et al., "Cylindrical rotating triboelectric nanogenerator," ACS Nano, vol. 7, No. 7, Jun. 2013, 6 pages.
Bae, J. et al., "Flutter-driven triboelectrification for harvesting wind energy," Nature Communications, vol. 5, Article No. 4929, Sep. 2014, 9 pages.
Abdelkareen, M. et al., "Vibration energy harvesting in automotive suspension system: A detailed review," Applied Energy, vol. 229, Nov. 2018, Elsevier, pp. 672-699.
Ma, T-W. et al., "A novel parametrically excited non-linear energy harvester", Mechanical Systems and Signal Processing, Apr. 2012 (available online Feb. 2012), vol. 28, pp. 323-332 <DOI:10.1016/j.ymssp.2012.01.017>.
Meninger, S. et al., "Vibration-to-electric energy conversion", IEEE Transactions on Very Large Scale Integration Systems, Feb. 2001, vol. 9, No. 1, pp. 64-76 <DOI:10.1109/92.920820>.
Nie, A. et al., "Twin boundary-assisted lithium ion transport", Nano Letters, 2015 (available online Dec. 2014), vol. 15, No. 1, pp. 610-615 <DOI:10.1021/nl504087z>.
Niu, S. et al., "Theoretical study of contact-mode triboelectric nanogenerators as an effective power source", Energy & Environmental Science, Sep. 2013, vol. 6, No. 12, pp. 3576-3583 <DOI:10.1039/C3EE42571A>.
Norman, R., "Water Salination: A Source of Energy", Science, Oct. 1974, vol. 186, No. 4161, pp. 350-352 <DOI:10.1126/science.186.4161.350>.
Post, J. et al., "Salinity-gradient power: Evaluation of pressure-retarded osmosis and reverse electrodialysis", Journal of Membrane Science, Feb. 2007, vol. 288, No. 1-2, pp. 218-230 <DOI:10.1016/j.memsci.2006.11.018>.
Radousky, H. et al., "Energy harvesting: an integrated view of materials, devices and applications", Nanotechnology, Nov. 2012, vol. 23, No. 50, article 502001, 35 pages <DOI:10.1088/0957-4484/23/50/502001.
Rica, R. et al., "Capacitive Mixing for Harvesting the Free Energy of Solutions at Different Concentrations", Entropy, Apr. 2013, vol. 15, No. 4, pp. 1388-1407 <DOI:10.3390/e15041388.
Rustomji, C. et al., "Liquefied gas electrolytes for electrochemical energy storage devices", Science, Jun. 2017, vol. 356, No. 6345, article eaal4263, 12 pages <DOI:10.1126/science.aal4263>.
Santos, L. et al., "Water with Excess Electric Charge", Journal of Physical Chemistry C, May 2011, vol. 115, No. 22, pp. 11226-11232 <DOI:10.1021/jp202652q>.
Sheberla, D. et al., "Conductive MOF electrodes for stable supercapacitors with high areal capacitance", Nature Materials, Feb. 2017 (published online Oct. 2016), vol. 16, pp. 220-224 <DOI:10.1038/nmat4766>.
Sterken, T. et al., "A new power MEMS component with variable capacitance", Proceedings of Pan Pacific Microelectronics Symposium (Kohala, HI, Feb. 18-20, 2003), 2003, pp. 27-34.
Sterken, T. et al., "An electret-based electrostatic /spl mu/-generator", 12th International Conference on Solid-State Sensors, Actuators and Microsystems. Digest of Technical Papers. (Boston, MA, Jun. 8-12, 2003), 2003 (date added to IEEE Xplore: Aug. 2003), 1291-1294 <DOI:10.1109/SENSOR.2003.1217009>.
Stokes, L. et al., "Renewable energy policy design and framing influence public support in the United States", Nature Energy, Jun. 2017, vol. 2, No. 17107, 6 pages <DOI:10.1038/nenergy.2017.107>.
Stootsman, J. et al., "New and Old Concepts in Thermoelectric Materials", Angewandte Chemie, Nov. 2009 (available online Oct. 2009), vol. 48, No. 46, pp. 8618-8639 <DOI:10.1002/anie.200900598>.
Swarnkar, A. et al., "Quantum dot-induced phase stabilization of α-CsPbI3 perovskite for high-efficiency photovoltaics", Science, Oct. 2016, vol. 354, No. 6308, pp. 92-95 <DOI:10.1126/science.aag2700>.
Uihlein, A. et al., "Wave and tidal current energy—A review of the current state of research beyond technology", Renewable and Sustainable Energy Reviews, May 2016, vol. 58, pp. 1070-1081 <DOI:10.1016/j.rser.2015.12.284>.
Varpula, A. et al., "Harvesting Vibrational Energy Using Material Work Functions", Scientific Reports, Oct. 2014, vol. 4, No. 6799, 9 pages <DOI:10.1038/srep06799>.
Verheijen, H. et al., "Reversible Electrowetting and Trapping of Charge: Model and Experiments", Langmuir, Sep. 1999, vol. 15, No. 20, pp. 6616-6620 <DOI:10.1021/la990548n>.

(56) References Cited

OTHER PUBLICATIONS

Wang, Z. et al., "Piezoelectric Nanogenerators Based on Zinc Oxide Nanowire Arrays", Science, Apr. 2006, vol. 312, No. 5771, pp. 242-246 <DOI:10.1126/science.1124005>.

Wang, Z. et al., "Progress in triboelectric nanogenerators as a new energy technology and self-powered sensors", Energy & Environmental Science, Jun. 2015, vol. 8, No. 8, pp. 2250-2282 <DOI:10.1039/C5EE01532D>.

Wang, Z. et al., "Triboelectric Nanogenerators as New Energy Technology for Self-Powered Systems and as Active Mechanical and Chemical Sensors", ACS Nano, Sep. 2013, vol. 7, No. 11, pp. 9533-9557 <DOI:10.1021/nn404614z>.

White, B., "Energy-Harvesting Devices: Beyond the Battery", Nature Nanotechnology, Feb. 2008, vol. 3, pp. 71-73 <DOI:10.1038/nnano.2008.19>.

Xue, G. et al., "Water-evaporation-induced electricity with nanostructured carbon materials", Nature Nanotechnology, Jan. 2017, vol. 12, pp. 317-321 <DOI:10.1038/nnano.2016.300>.

Yang, Y. et al., "Charging-free electrochemical system for harvesting low-grade thermal energy", Proceedings of the National Academy of Sciences, Nov. 2014, vol. 111, No. 48, pp. 17011-17016 <DOI:10.1073/pnas.1415097111>.

Yatsuzuka, K. et al., "Electrification phenomena of pure water droplets dripping and sliding on a polymer surface", Journal of Electrostatics, Apr. 1994, vol. 32, No. 2, pp. 157-171 <DOI:10.1016/0304-3886(94)90005-1>.

Yin, J. et al., "Waving potential in graphene", Nature Communications, May 2014, vol. 5, No. 3582, 6 pages <DOI:10.1038/ncomms4582>.

Zhang, J. et al., "Superhydrophobic PTFE Surfaces by Extension", Macromolecular Rapid Communications, Jun. 2004 (first published May 2004), vol. 25, No. 11, pp. 1105-1108 <DOI:10.1002/marc.200400065>.

Zhu, G. et al., "Toward Large-Scale Energy Harvesting by a Nanoparticle-Enhanced Triboelectric Nanogenerator", Nano Letters, Jan. 2013, vol. 13, No. 2, pp. 847-853 <DOI:10.1021/nl4001053>.

Zuo, L. et al., "Energy Harvesting, Ride Comfort, and Road Handling of Regenerative Vehicle Suspensions", Journal of Vibration and Acoustics, Feb. 2013, vol. 135, No. 1, article 011002, 8 pages <DOI:10.1115/1.4007562>.

\* cited by examiner

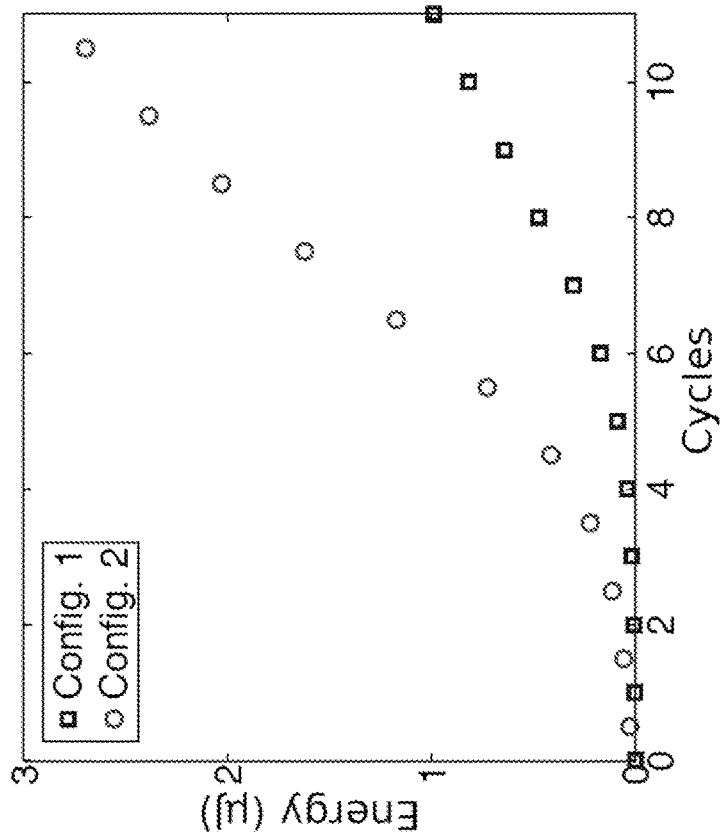
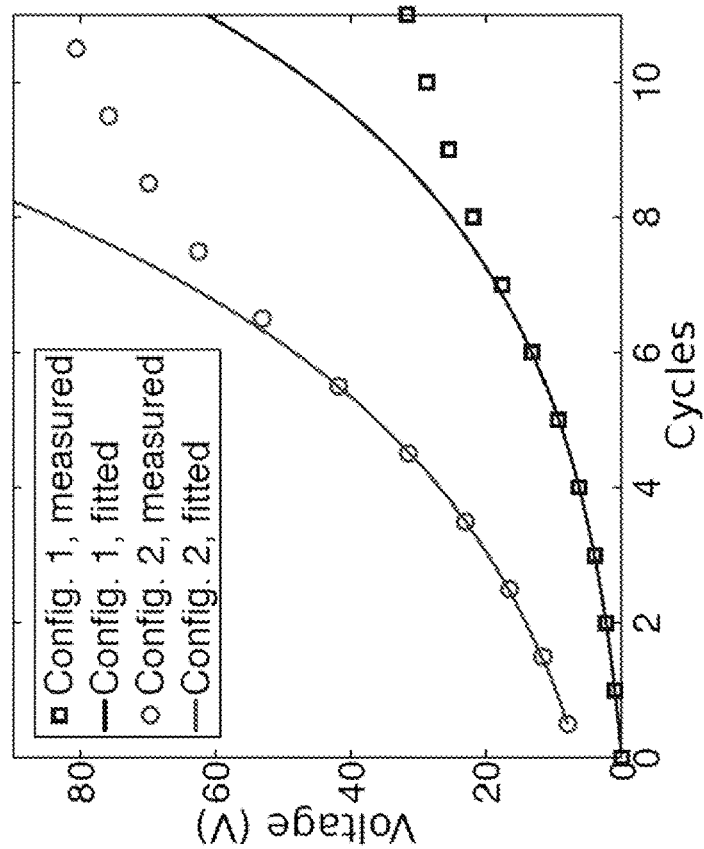
FIG. 8A
FIG. 8B

SELF-CHARGING DROPLET CAPACITOR FOR HARVESTING LOW-LEVEL AMBIENT ENERGY

RELATED APPLICATIONS

This application is a national stage application filed under 35 U.S.C. § 371 of PCT/US2021/030139 filed Apr. 30, 2021, which claims the benefit of U.S. provisional patent application Ser. No. 63/017,822, filed Apr. 30, 2020, the disclosures of which are hereby incorporated herein by reference in their entireties.

FIELD OF THE DISCLOSURE

The present disclosure is related to energy harvesting devices.

BACKGROUND

There are plentiful and diverse energy sources in the ambient environment. In addition to the well-known types, i.e., energy from solar radiation, winds, ocean waves, etc., many other types of energy are abundant, and yet, largely untapped. For example, mechanical "free" energy is almost ubiquitous, as in human activities (such as walking) and vibrations of household appliances. As rapid technological advances continue to create new frontiers of electronic devices with ultra-low power consumption, interest in extracting this untapped mechanical energy has been growing as it holds great promise of evolving into an enabling technology for next-generation self-powered electronic systems.

Based on the energy transduction mechanism used, existing schemes can be categorized into three major groups, i.e., electromagnetic, piezoelectric, and electrostatic, each possessing unique advantages and challenges. Of particular interest is the electrostatic approach due to its advantages in, among others, efficiency, circuitry integration and device miniaturization. In an electrostatic device, energy is harvested through the external work done against the electrical field in a charged capacitor. It is normally realized by reducing the capacitance while keeping the charge intact. The higher the charge carried by the capacitor, the more effective it is.

In early studies, external power sources were widely used to provide the required charge. Lately, use of electrets has become the primary method for eliminating such cumbersome external power sources to improve device integration and performance. Due to environmental conditions, rapid loss of charge can occur in electrets, leading to performance degradation. More recently, contact electrification has received growing attention as a means to both provide and maintain the required charge in an electret. It allows the lost charge to be self-replenished when the device is in operation. However, as a spontaneous process, contact electrification only allows for a limited amount of charge refill, which limits the effectiveness of this method.

SUMMARY

A self-charging droplet capacitor for harvesting low-level ambient energy is provided. The capacitor includes a conductive liquid droplet, which is placed on a heterogeneous and hydrophobic surface of dielectric materials coated onto a conductive substrate. The substrate and the droplet, along with the dielectric materials in between, form a parallel-plate type capacitor. The droplet is free to move on the surface, and thus provides a position-dependent variation of capacitance. The surface consists of two regions, each with a different material and thickness. The different strengths of solid-water contact electrification of the two materials give rise to a self-charging mechanism. The variation in thickness allows for the capacitance change required for energy harvesting.

In some embodiments, a device is fabricated with two or more droplet capacitors and one ceramic capacitor. Passive diode switches are used to enable reconfiguration of the connectivity of the capacitors, which leads to a geometrical growth of the energy in the system. With a 450 microliter (μL) water drop in each capacitor, the device can effectively harvest energy from low ambient vibrations. The energy harvested grows by 100 times within 11 cycles, sufficient to illuminate 30 light-emitting diodes (LEDs) connected in series.

An exemplary embodiment provides a self-charging droplet capacitor. The self-charging droplet capacitor includes a conductive substrate; a dielectric layer over the conductive substrate and forming a hydrophobic surface having a first region and a second region, wherein the first region and the second region of the dielectric layer have at least one of a difference in thickness or a difference in dielectric constant such that the first region has at least twice a capacitance of the second region; a conductive liquid droplet placed over the dielectric layer such that it is free to move on the hydrophobic surface; and an electrical lead in continuous contact with the conductive liquid droplet as it moves on the hydrophobic surface, wherein the electrical lead and the conductive substrate are coupled across a base capacitor such that the base capacitor is charged as the conductive liquid droplet moves from the first region to the second region and from the second region to the first region.

Another exemplary embodiment provides a self-charging device. The self-charging device includes a base capacitor; a first droplet capacitor; a second droplet capacitor, wherein each of the first droplet capacitor and the second droplet capacitor is configured to produce a positive charge in a first state and a negative charge in a second state; and solid state switching elements coupling the first droplet capacitor and the second droplet capacitor to the base capacitor such that the positive charge and the negative charge produced by the first droplet capacitor and the second droplet capacitor control the solid state switching elements and charge the base capacitor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 8A is a graphical representation of voltage accumulation of an embodiment of the self-charging device in the first configuration and the second configuration.

FIG. 8B is a graphical representation of harvested energy of the embodiment of the self-charging device in the first configuration and the second configuration.

DETAILED DESCRIPTION

Figure 1B:
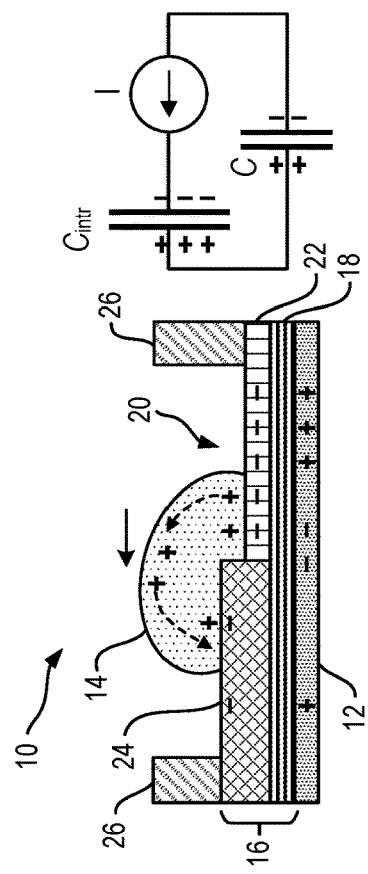
FIG. 1B is a schematic diagram of the self-charging droplet variable capacitor of FIG. 1A in a first transition state.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A self-charging droplet capacitor for harvesting low-level ambient energy is provided. The capacitor includes a conductive liquid droplet, which is placed on a heterogeneous and hydrophobic surface of dielectric materials coated onto a conductive substrate. The substrate and the droplet, along with the dielectric materials in between, form a parallel-plate type capacitor. The droplet is free to move on the surface, and thus, provides a position-dependent variation of capacitance. The surface consists of two regions, each with a different material and thickness. The different strengths of solid-water contact electrification of the two materials give rise to a self-charging mechanism. The variation in thickness allows for the capacitance change required for energy harvesting.

In some embodiments, a device is fabricated with two or more droplet capacitors and one ceramic capacitor. Passive diode switches are used to enable reconfiguration of the connectivity of the capacitors, which leads to a geometrical growth of the energy in the system. With a 450 microliter (µL) water drop in each capacitor, the device can effectively harvest energy from low ambient vibrations. The energy harvested grows by 100 times within 11 cycles, sufficient to illuminate 30 light-emitting diodes (LEDs) connected in series.

I. Introduction

Embodiments described herein provide a droplet variable capacitor, which self charges each time the droplet moves across a hydrophobic surface while simultaneously varying the capacitance. An energy harvesting device can be fabricated with multiple such capacitors. When driven by an external excitation, the device switches between two configurations, allowing a positive feedback mechanism to be established, which drives the energy stored in the device to grow exponentially. Semiconductor diodes are used to provide automatic switching without the need for mechanical switches. The self-charging effect produces sufficient energy for the initial operation of semiconductor diodes, which allows for continuous energy harvesting in the successive cycles. Using a water drop of 450 µL, the capacitor self charges by 3.8 nanocoulombs (nC) when the drop moves across the surface. Within 11 energy harvesting cycles, a 100-fold increase in energy stored in the system has been observed, from 0.027 µJ to 2.7 µJ. A device with two 450 µL water drops can produce sufficient energy to illuminate 30 green LEDs connected in series.

II. Self-Charging Droplet Variable Capacitor

A. Materials and Methods

Figure 1C:
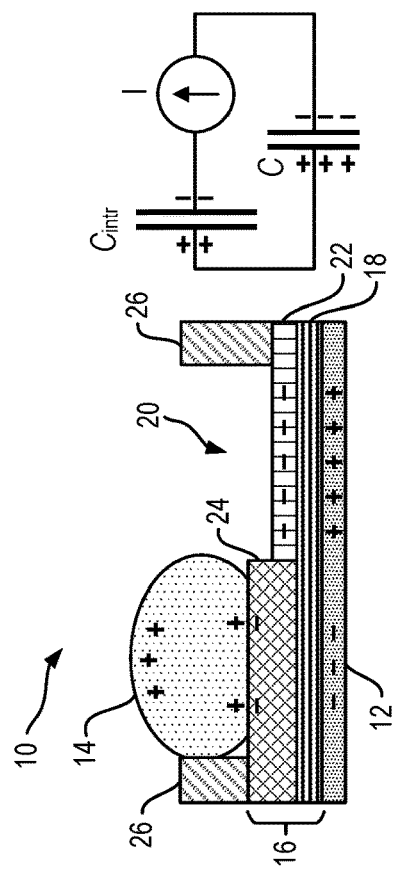
FIG. 1C is a schematic diagram of the self-charging droplet variable capacitor of FIG. 1A in a charged state.
Figure 1A:
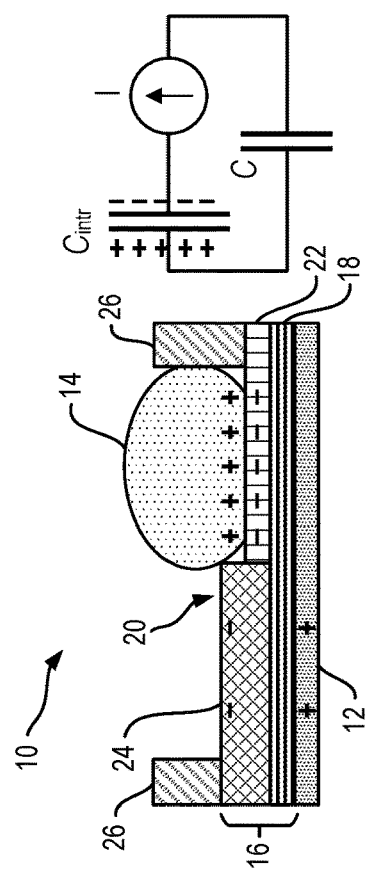
FIG. 1A is a schematic diagram of an exemplary self-charging droplet variable capacitor according to embodiments described herein in an initial, uncharged state.
Figure 1D:
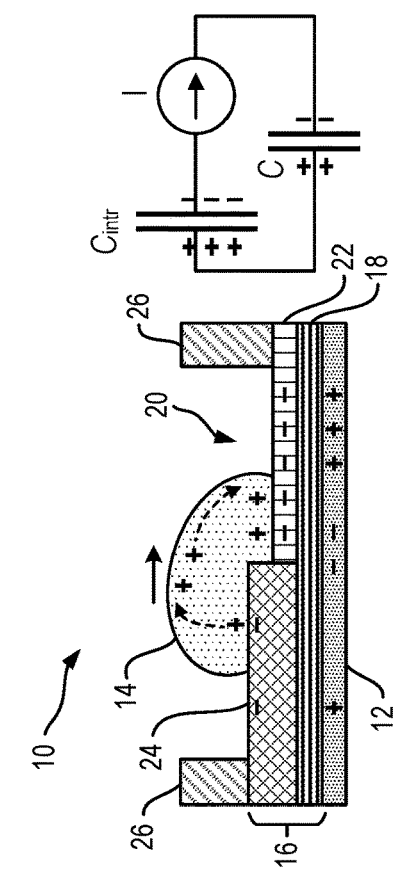
FIG. 1D is a schematic diagram of the self-charging droplet variable capacitor of FIG. 1A in a second transition state.

FIG. 1A is a schematic diagram of an exemplary self-charging droplet variable capacitor 10 according to embodiments described herein in an initial, uncharged state. FIG. 1B is a schematic diagram of the self-charging droplet variable capacitor 10 of FIG. 1A in a first transition state. FIG. 1C is a schematic diagram of the self-charging droplet variable capacitor 10 of FIG. 1A in a charged state. FIG. 1D is a schematic diagram of the self-charging droplet variable capacitor 10 of FIG. 1A in a second transition state.

FIGS. 1A-1D further illustrate the working principle of the self-charging droplet variable capacitor 10 (e.g., part or all of an energy harvesting capacitive device). As in a traditional capacitor, the droplet variable capacitor 10 includes two electrodes with dielectric materials in between. One of the electrodes is made from a solid, conductive material (e.g., doped silicon in the illustrated example, though any conductive material may be used), which may also serve as the substrate of the device (e.g., a conductive substrate 12). A movable, conductive droplet 14 is used as the other electrode. The mobility of the conductive droplet 14 allows for a position-dependent variation of capacitance.

In the illustrated embodiment, a dielectric layer 16 is composed of a passivation layer 18 (e.g., a layer of tantalum pentoxide) coated with a heterogeneous surface 20. The heterogeneity involves two aspects, each serving a distinct purpose. The heterogeneous surface 20 contains two regions 22, 24 of different thicknesses and materials. In an exemplary aspect, a first region 22 is thinner (resulting in a higher capacitance) and second region 24 is thicker. The variation in thickness allows the capacitance to change with the position of the conductive droplet 14. In some embodiments, the capacitance in the first region 22 is at least twice the capacitance of the second region 24 to improve energy harvesting of the droplet variable capacitor 10. The material difference (e.g., polytetrafluoroethylene (PTFE) for the first region 22 and CYTOP for the second region 24) allows for self-charging as a result of contact electrification. Some embodiments may use a common dielectric material with a varied thickness, which may require treatment of the surfaces in the first region 22 and the second region 24 to facilitate contact electrification.

In some examples, the two regions 22, 24 have similar dielectric constants. As used herein, materials with a "similar" dielectric constant refers to any two or more materials having dielectric constant values within a tolerance of ±5% of each other. In the illustrated embodiment, the first region 22 is formed from PTFE and the second region 24 is formed from CYTOP (e.g., with PTFE and CYTOP having a similar dielectric constant of 2). The capacitance is thus primarily determined by the thickness of the dielectric layer 16. The effect of contact electrification between water and CYTOP is much weaker than that between water and PTFE. In some embodiments, the difference in dielectric constant between the first region 22 may be larger (e.g., to have a planar surface, the dielectric constant in the first region 22 may be twice the dielectric constant in the second region 24).

The resulting surface charge densities of the two regions 22, 24 are significantly different. Such a difference in surface charge density creates a self-charging mechanism for the droplet variable capacitor 10. Without loss of generality, it can be assumed the conductive droplet 14 is initially on PTFE with both electrodes grounded (FIG. 1A). The device can be modeled as a charge source powering two capacitors connected in series. One of the capacitors, referred to as the intrinsic capacitor $C_{intr}$ herein, is established at the liquid-solid interface in a similar manner as an electrical double-layer due to the surface charge, while the other, referred to as the droplet capacitor C herein, is established due to the electrodes and dielectric layers.

In the initial state, the intrinsic capacitance $C_{intr}$ is charged due to the surface charge while the droplet capacitor C is neutral. When the conductive droplet 14 moves across the surface to the CYTOP region, the lower surface charge density of the CYTOP surface induces a discharging current from the intrinsic capacitor $C_{intr}$, which charges the droplet capacitor C (FIG. 1B) until the conductive droplet 14 is completely on the CYTOP surface (FIG. 1C).

If the conductive droplet 14 then moves backward toward the PTFE side, the higher surface charge density on the PTFE surface will lead to discharging of the droplet capacitor C and charging of the intrinsic capacitor $C_{intr}$ (FIG. 1D) until the conductive droplet 14 is completely in the PTFE region and the initial state is restored (FIG. 1A). It is thus reasonable to model the entire device as one capacitor, which acquires a certain amount of positive charge when the conductive droplet 14 moves from the first region 22 (e.g., the PTFE region) to the second region 24 (e.g., the CYTOP region) and the same amount of negative charge when the conductive droplet 14 moves from the second region 24 to the first region 22.

In an exemplary aspect, the conductive droplet 14 is encapsulated in the droplet variable capacitor 10 by sidewalls 26 made from an appropriate material (e.g., an insulating material such as acrylic). The conductive droplet 14 may further be encapsulated by a lid (not shown) such that the conductive droplet 14 resides (and moves freely) within an air cavity. The conductive droplet 14 may be any conductive liquid or gel, such as water, a liquid metal (e.g., mercury, cesium, rubidium, francium, gallium, alloys of these, etc.), a liquid conductive polymer, and so on.

B. Device Fabrication

A self-charging variable capacitor 10 according to FIGS. 1A-1D was fabricated on a doped silicon substrate that was coated with 300 nanometer (nm)-thick tantalum pentoxide ($Ta_2O_5$). The doped silicon substrate functioned as a fixed electrode for the device. The $Ta_2O_5$ coating provided necessary insulation to avoid the device being shorted due to possible pin holes in the hydrophobic coatings. The thicknesses of PTFE and CYTOP coatings were approximately 0.8 microns ($\mu m$) and 19.5 $\mu m$, respectively. A water drop of a volume of 450 $\mu L$ was used as the conductive droplet 14 (e.g., movable electrode). The corresponding capacitance was measured directly to be C=2.77 nanofarads (nF) when the water drop was on PTFE and C'=0.13 nF when it was on CYTOP.

III. Self-Charging Device

A. Energy Harvesting Mechanism

It has been shown that proper, repetitive reconfiguration of a system of variable capacitors induces positive feedback on the electric energy stored in the system. Such a snowball effect is beneficial to scavenging low-level energy from the ambient environment.

Figure 2C:
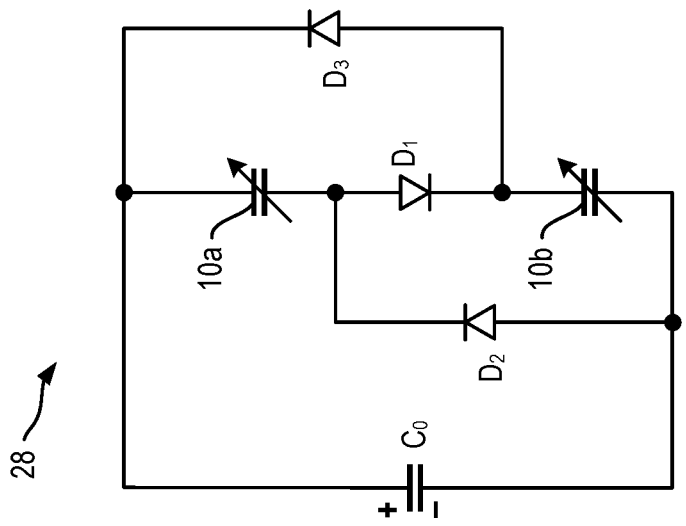
FIG. 2C is a second configuration of the three-capacitor self-charging device of FIG. 2A in which the first self-charging variable capacitor and the second self-charging variable capacitor reduce in capacitance and are connected in parallel.
Figure 2B:
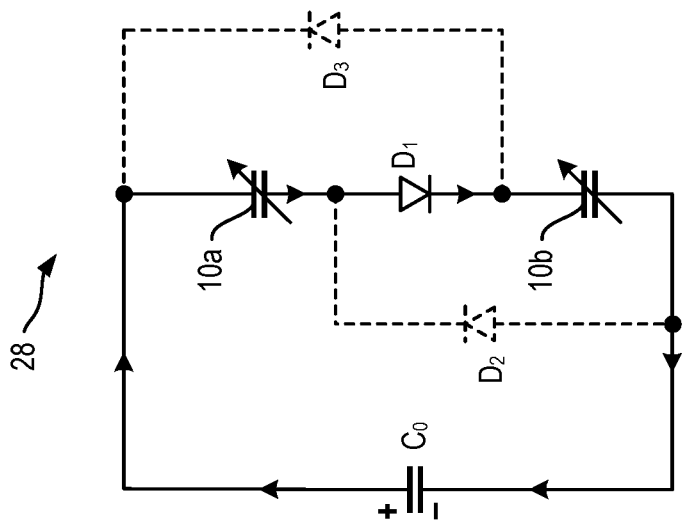
FIG. 2B is a first configuration of the three-capacitor self-charging device of FIG. 2A in which a first self-charging variable capacitor and a second self-charging variable capacitor are connected in series.
Figure 2A:
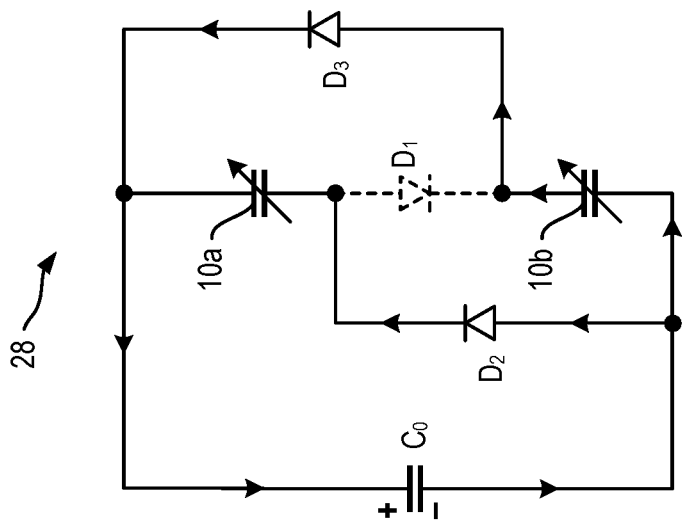
FIG. 2A is an equivalent circuit diagram of a three-capacitor self-charging device according to embodiments described herein.

FIG. 2A is an equivalent circuit diagram of a three-capacitor self-charging device 28 according to embodiments described herein. FIG. 2B is a first configuration of the three-capacitor self-charging device 28 of FIG. 2A in which a first self-charging variable capacitor 10a (having a first capacitance $C_1$) and a second self-charging variable capacitor 10b (having a second capacitance $C_2$) are connected in series. FIG. 2C is a second configuration of the three-capacitor self-charging device 28 of FIG. 2A in which the first self-charging variable capacitor 10a and the second self-charging variable capacitor 10b reduce in capacitance and are connected in parallel.

The self-charging device 28 includes the first self-charging variable capacitor 10a, the second self-charging variable capacitor 10b, and a fixed base capacitor $C_0$ interconnected by solid state switching elements (e.g., $D_1$, $D_2$, $D_3$). In this regard, the self-charging device 28 of FIGS. 2A-2C can be switched between parallel and series configurations to facilitate self-charging. In each configuration, the electric current flows in a fixed direction. In the first configuration (FIG. 2B), the current flows from the base capacitor $C_0$ to the variable capacitors 10a (with capacitance $C_1$) and 10b (with capacitance $C_2$), which are connected in series. In the second configuration (FIG. 2C), the variable capacitors are connected in parallel with the capacitances being reduced by external work, i.e., $C'_1<C_1$ and $C'_2<C_2$. In this configuration, the current flows from the first variable capacitor 10a (with capacitance $C'_1$) and the second variable capacitor 10b (with capacitance $C'_2$) to the base capacitor $C_0$.

It is thus possible to use solid state switching elements, such as diodes or transistors, instead of mechanical switches to provide the required switching during reconfiguration provided that the required voltages to turn the solid state switching elements on (e.g., forward biases in the case of diodes) can be achieved. This also provides improved integration between the design of the energy harvester (e.g., the self-charging variable capacitors) and the supporting circuit.

In an exemplary aspect, the first self-charging variable capacitor 10a is connected (e.g., directly connected) to a first node of the base capacitor $C_0$ and the second self-charging variable capacitor 10b is connected (e.g., directly connected) to a second node of the base capacitor $C_0$. A first switching element (e.g., first diode $D_1$) is coupled between the first self-charging variable capacitor 10a and the second self-charging variable capacitor 10b (e.g., with the anode of the first switching element connected to the first self-charging variable capacitor 10a). In this regard, the first self-charging variable capacitor 10a is coupled between the first node of the base capacitor $C_0$ and the first switching element (first diode $D_1$), and the second self-charging variable capacitor 10b is coupled between the second node of the base capacitor $C_0$ and the first switching element (first diode $D_1$). A second switching element (second diode $D_2$) is coupled between the second node of the base capacitor $C_0$ and a node between the first self-charging variable capacitor 10a and the first switching element (e.g., such that the cathode of the second diode $D_2$ is connected to the anode of the first diode $D_1$). A third switching element (third diode $D_3$) is coupled between the first node of the base capacitor $C_0$ and a node between the second self-charging variable capacitor 10b and the first switching element (e.g., such that the anode of the third diode $D_3$ is connected to the cathode of the first diode $D_1$).

The basic switching mechanism is described as follows. It should be understood that while the mechanism is discussed with respect to diodes as switching elements, other solid state switching elements may be used, including diodes (e.g., standard diodes, Schottky diodes, Zener diodes, PIN diodes, etc.), transistors (e.g., bipolar transistors, field effect transistors, etc.), thyristors, etc., and combinations thereof. When the voltage across the base capacitor $C_0$ is sufficiently greater than the sum of those across the first self-charging variable capacitor 10a and the second self-charging variable capacitor 10b, the first diode $D_1$ is on whereas the second diode $D_2$ and the third diode $D_3$ are both off due to being reverse biased. Thus, the current flows from the base capacitor $C_0$ to the first self-charging variable capacitor 10a and the second self-charging variable capacitor 10b as shown in FIG. 2B. The current stops after the system reaches equilibrium.

Figure 4:
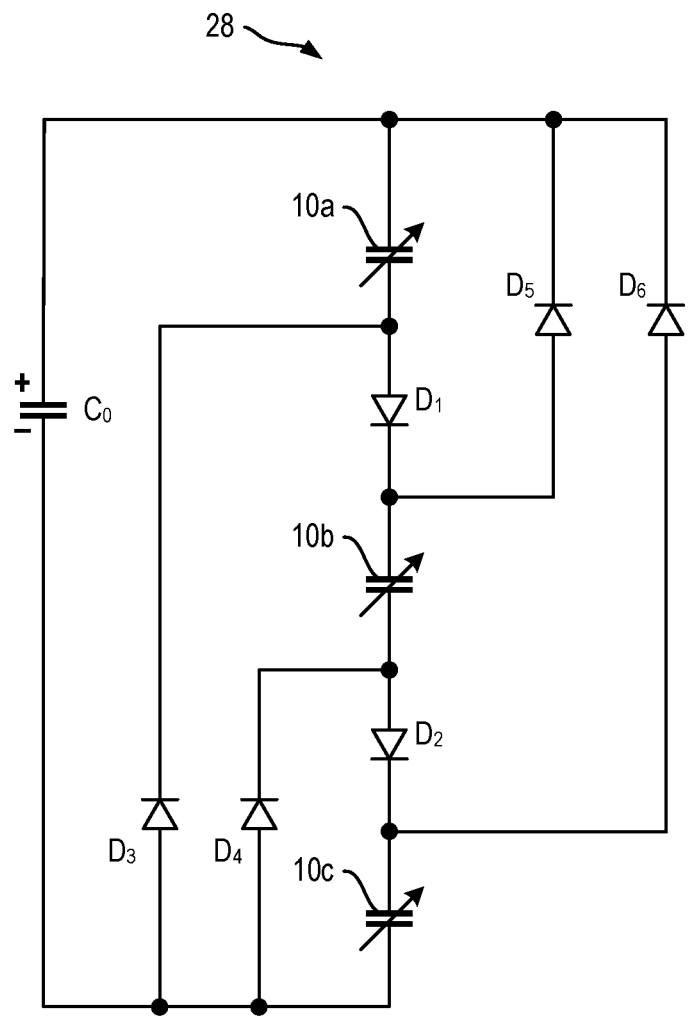
FIG. 4 is an equivalent circuit diagram of a four-capacitor self-charging device according to embodiments described herein.
Figure 5:
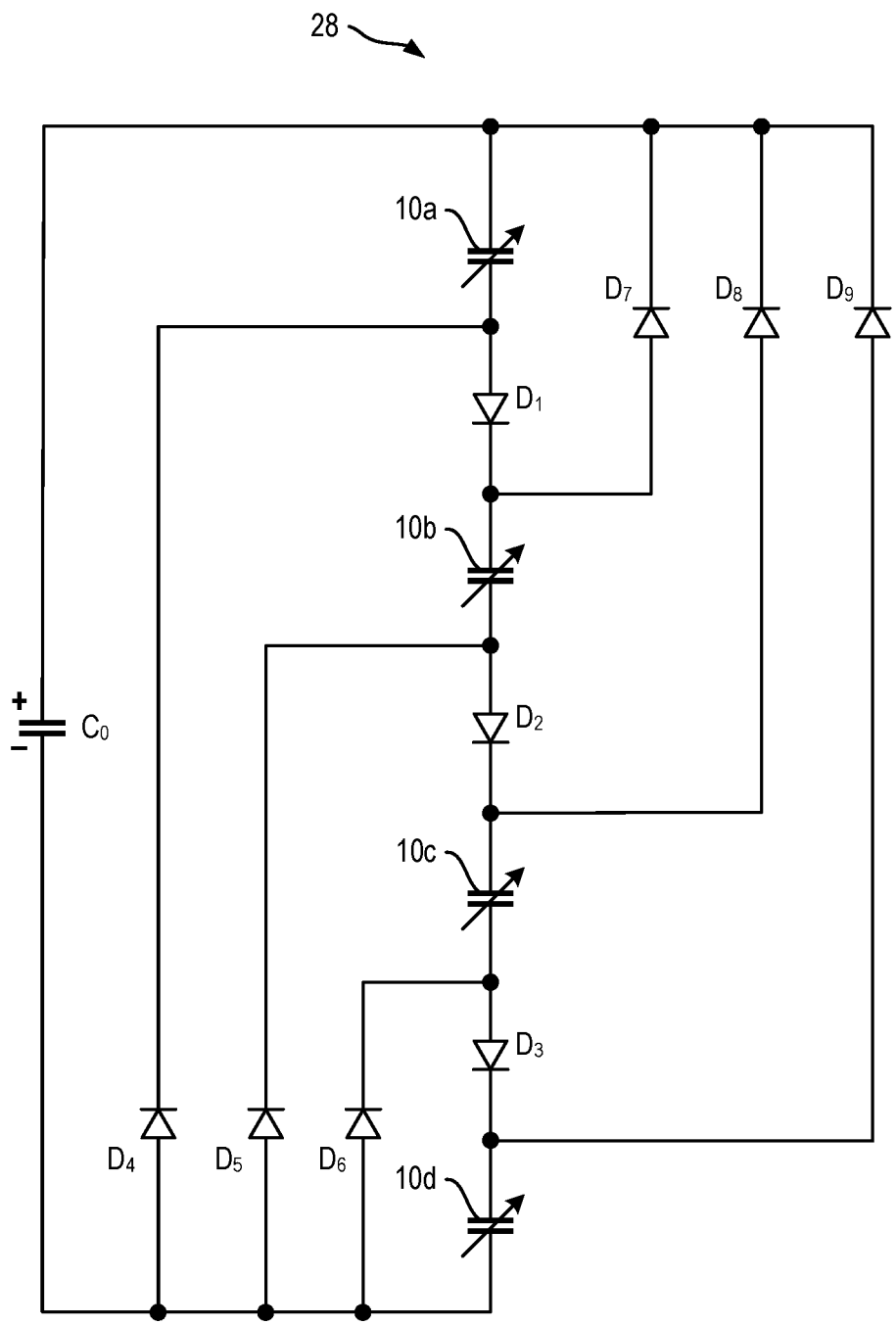
FIG. 5 is an equivalent circuit diagram of a five-capacitor self-charging device according to embodiments described herein.

The capacitances of the first self-charging variable capacitor 10a and the second self-charging variable capacitor 10b are then reduced to $C'_1<C_1$ and $C'_2<C_2$, respectively, due to the external energy input (e.g., from motion or vibration of the self-charging device 28). As a result, the voltages respectively across the first self-charging variable capacitor 10a and the second self-charging variable capacitor 10b increase while the total charge remains the same. Such increase in voltage creates a forward bias for both the second diode $D_2$ and the third diode $D_3$ while keeping the first diode $D_1$ off. If there is sufficient amount of charge, the increase of voltages will be large enough to turn on the second diode $D_2$ and the third diode $D_3$ to allow a current to flow from the first self-charging variable capacitor 10a and the second self-charging variable capacitor 10b to the base capacitor $C_0$ as shown in FIG. 2C. Note that the circuit model shown in FIGS. 2A-2C can be extended to include any number of variable capacitors as demonstrated in Section III.C (FIGS. 4 and 5).

B. Device Implementation

Figures 3A, 3B, 3C:
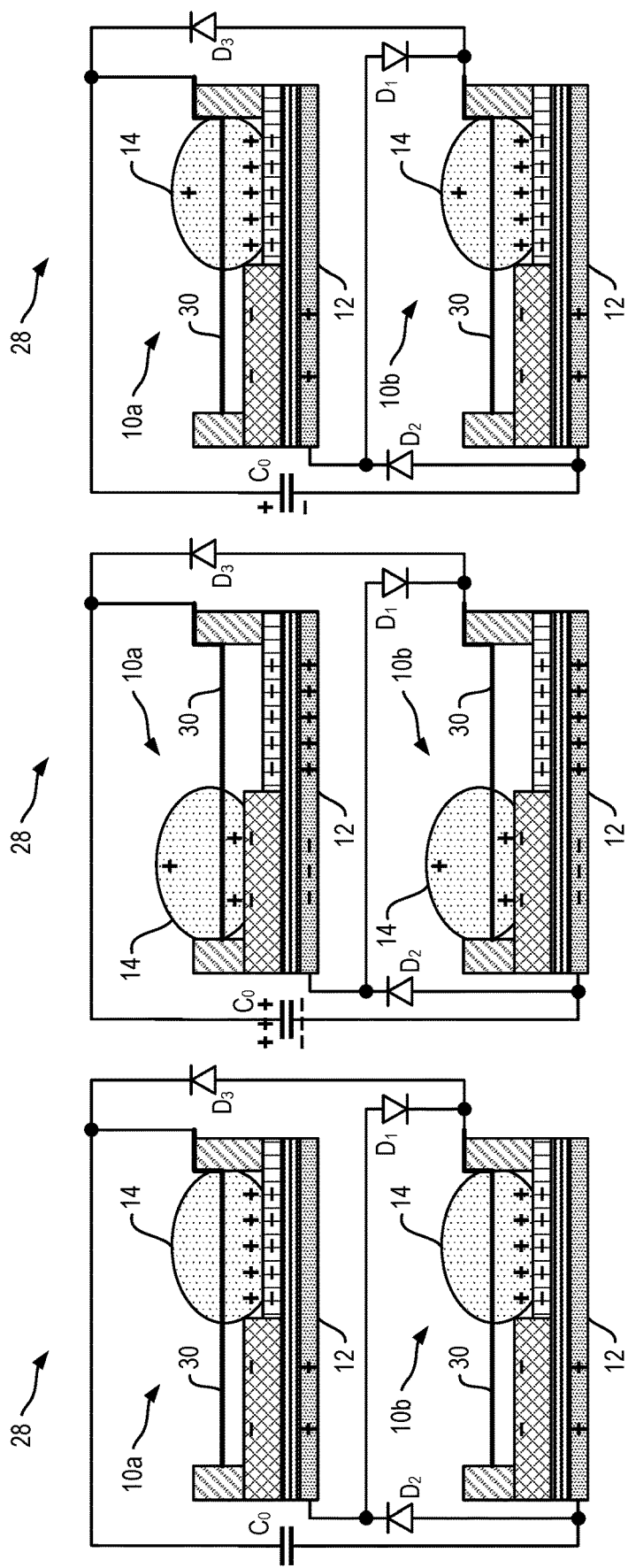
FIG. 3A is a schematic diagram of an exemplary three-capacitor self-charging device according to embodiments described herein in an initial, uncharged state.
FIG. 3B is a schematic diagram of the three-capacitor self-charging device of FIG. 3A after transition of the conductive droplet from the first region of the dielectric layer to the second region.
FIG. 3C is a schematic diagram of the three-capacitor self-charging device of FIG. 3A after transition of the conductive droplet back to the first region.

FIG. 3A is a schematic diagram of an exemplary three-capacitor self-charging device 28 according to embodiments described herein in an initial, uncharged state. FIG. 3B is a schematic diagram of the three-capacitor self-charging device 28 of FIG. 3A after transition of the conductive droplet 14 from the first region (PTFE) of the dielectric layer to the second region (CYTOP). FIG. 3C is a schematic diagram of the three-capacitor self-charging device 28 of FIG. 3A after transition of the conductive droplet 14 back to the first region (PTFE).

As an example, FIGS. 3A-3C show the working principle of an embodiment involving two self-charging droplet variable capacitors 10a, 10b and one fixed capacitor. In an exemplary aspect, each droplet variable capacitor 10a, 10b includes an electrical lead 30 in continuous contact with the conductive liquid droplet 14 as it moves on the dielectric surface. The electrical lead 30 may, for example, be a wire running through the air cavity of the conductive droplet 14, or it may be a conductive material deposited over a lid and/or sidewall of the air cavity.

Depending on the positions of the conductive droplets 14, the system can be switched between two configurations: the first configuration, in which both conductive droplets 14 are on the surface of the thinner, PTFE region with diodes connected such that if the first diode $D_1$ is on, both the second diode $D_2$ and the third diode $D_3$ will be off, and hence the first self-charging variable capacitor 10a and the second self-charging variable capacitor 10b are connected in series; and the second configuration, in which both conductive droplets 14 are on the surface of the thicker, CYTOP region. In this configuration, if both the second diode $D_2$ and the third diode $D_3$ are on, the first diode $D_1$ will be off, and thus, the first self-charging variable capacitor 10a and the second self-charging variable capacitor 10b are connected in parallel.

Without loss of generality, it is assumed in the initial state, the system is in the first configuration and both conductive droplets 14 are grounded so that there is no unbalanced charge in the conductive droplets 14 (FIG. 3A). There is no initial charge in the base capacitor $C_0$. An external excitation drives the conductive droplets 14 to move toward the CYTOP region. If the self-charging effect is sufficiently strong, the second diode $D_2$ and the third diode $D_3$ will be on while the first diode $D_1$ will be off due to the reverse bias. The system is switched to the second configuration. Charge will flow to the base capacitor $C_0$ as shown in FIG. 3B.

The base capacitor $C_0$ is now charged. The external excitation (e.g., a motion or vibration of the self-charging device 28) then drives the conductive droplets 14 back to the PTFE region. The first diode $D_1$ is turned on while the second diode $D_2$ and the third diode $D_3$ are off. The system is in the first configuration again. Charge flows from the base capacitor $C_0$ to the conductive droplets 14 as shown in FIG. 3C.

The work done by the external excitation is converted to electrical energy, which is stored in the capacitors. If the excitation is periodic such that the conductive droplets 14 are driven to continuously move between the two surface regions, it is possible for the electrical energy to grow exponentially because of the positive feedback resulting from the continuous switching of the system between two configurations.

Using the equivalent circuit model shown in FIGS. 2A-2C, the energy harvesting process can be quantitatively analyzed. Here a device composed of a base capacitor $C_0$ and an arbitrary number (n>1) of variable capacitors is considered. For simplicity, the following assumptions are made: (1) all variable capacitors are identical, i.e., $C_1 = C_2 = \ldots C_n = C$, $C'_1 = C'_2 = \ldots C'_n = C'$; (2) the motion induced self-charging effect imposes a fixed amount of charge, $\overline{Q}_{self}$, to each conductive droplet 14, and (3) the conductive droplets 14 are driven by an external excitation to repetitively move across the two regions on the surface in the same manner.

It is noted that the reverse biases on the diodes can be significantly different, and thus, the number of diodes required for each configuration to avoid diode breakdown can be different. Therefore, it is further assumed that the total forward bias on the diodes for the first configuration is $V_{F1}$ and that for the second configuration is $V_{F2}$. An energy harvesting cycle is defined as the time required for the conductive droplets 14 to complete a single round-trip on the surface, within which the system completes reconfiguration twice and is in the configuration of the initial state. The end of the ith cycle is also the start of the i+1th cycle. It can be shown that the total charge in the system follows $$Q_t^{(w)}(i) = \gamma Q_t^{(w)}(i-1) + Q_\zeta^{(w)}, \gamma = \frac{n(1+\alpha)(1+\beta)}{(n+\alpha)(n+\beta)} \quad \text{Equation 1}$$

where $\alpha = C_0/C'$, $\beta = C/C_0$, $Q_t^{(w)}(i)(w=1,2)$ is the charge in the system for each configuration in the ith cycle, $Q_\zeta^{(w)}$ is the amount of charge from the combined effect of the diodes and self-charging capacitors, i.e., $$Q_\zeta^{(1)} = \frac{n-1}{n+\alpha}\alpha\overline{Q}_{self} - \frac{(n-1)^2(1+\alpha)}{(n+\alpha)(n+\beta)}\beta C_0 V_{F1} - \frac{n-1}{n+\alpha}C_0 V_{F2}, \text{ and}$$

$$Q_\zeta^{(2)} = -\frac{n(n-1)}{(n+\beta)}\overline{Q}_{self} - \frac{(n-1)^2}{n+\beta}\beta C_0 V_{F1} - \frac{n(n-1)(1+\beta)}{(n+\beta)(n+\alpha)}C_0 V_{F2}.$$

It can be shown that $$\gamma > 1 \text{ if } \frac{C}{C'} = \alpha\beta > n.$$

The total charge in the system will grow exponentially.

C. Additional Embodiments

FIG. 4 is an equivalent circuit diagram of a four-capacitor self-charging device 28 according to embodiments described herein. The four-capacitor embodiment includes three self-charging variable capacitors 10a, 10b, 10c and a base capacitor $C_0$ connected with six switching elements in a manner similar to the three-capacitor embodiment of FIGS. 2A-2C and FIGS. 3A-3C. That is, in the first configuration, the first self-charging variable capacitor 10a, the second self-charging variable capacitor 10b, and a third self-charging variable capacitor 10c are connected in series across the base capacitor $C_0$. In the second configuration, the first self-charging variable capacitor 10a, the second self-charging variable capacitor 10b, and the third self-charging variable capacitor 10c are connected in parallel with each other and the base capacitor $C_0$.

FIG. 5 is an equivalent circuit diagram of a five-capacitor self-charging device 28 according to embodiments described herein. The five-capacitor embodiment includes four self-charging variable capacitors 10a, 10b, 10c, 10d and a base capacitor $C_0$ connected with nine switching elements in a manner similar to the three-capacitor embodiment of FIGS. 2A-2C and FIGS. 3A-3C. That is, in the first configuration, the first self-charging variable capacitor 10a, the second self-charging variable capacitor 10b, the third self-charging variable capacitor 10c, and a fourth self-charging variable capacitor 10d are connected in series across the base capacitor $C_0$. In the second configuration, the first self-charging variable capacitor 10a, the second self-charging variable capacitor 10b, the third self-charging variable capacitor 10c, and the fourth self-charging variable capacitor 10d are connected in parallel with each other and the base capacitor $C_0$.

IV. Results

A. Device Characterization

Figure 6B:
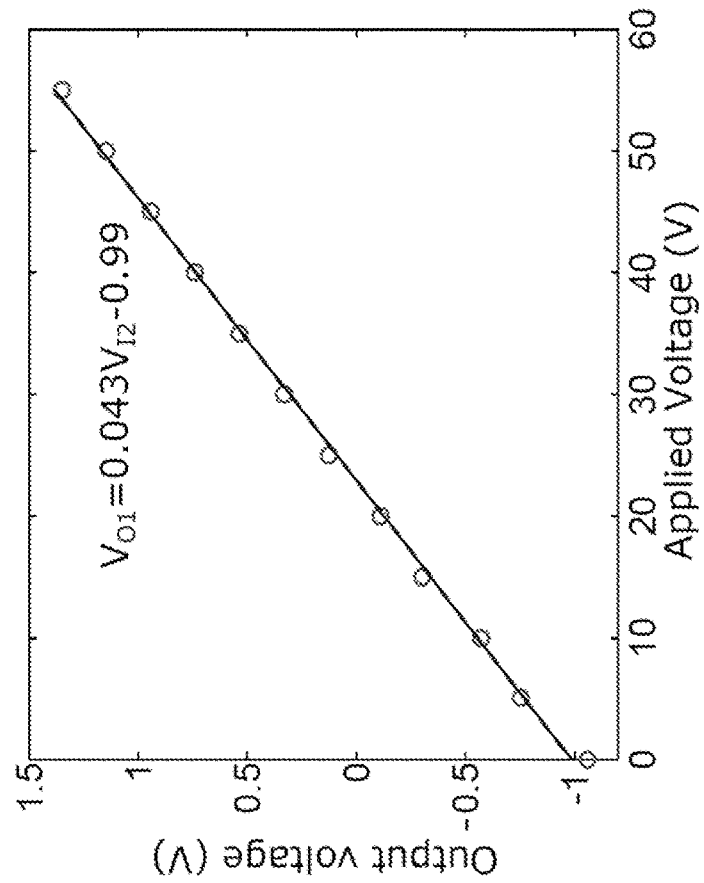
FIG. 6B is a graphical representation of an output voltage of a self-charging variable capacitor as the conductive droplet moves from the second region to the first region of the dielectric layer.
Figure 6A:
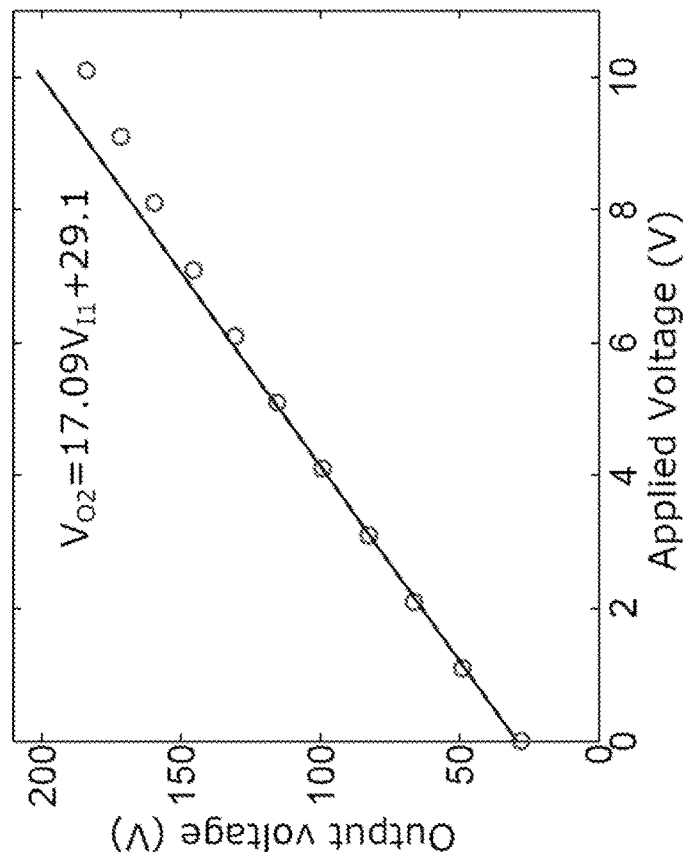
FIG. 6A is a graphical representation of an output voltage of a self-charging variable capacitor as the conductive droplet moves from the first region to the second region of the dielectric layer.

FIG. 6A is a graphical representation of an output voltage of a self-charging variable capacitor as the conductive droplet moves from the first region (PTFE) to the second region (CYTOP) of the dielectric layer. FIG. 6B is a graphical representation of an output voltage of a self-charging variable capacitor as the conductive droplet moves from the second region (CYTOP) to the first region (PTFE) of the dielectric layer. FIGS. 6A and 6B show the electrical outputs of a self-charging variable capacitor with a 450 μL water drop. A voltage was applied to the variable capacitor when the water drop was on one side and the voltage was measured after the water drop was moved across the junction to the other surface.

FIG. 6A shows the results obtained when the voltage was applied when the water drop was on PTFE. The results for the case where the voltage was applied when the water drop was on CYTOP are shown in FIG. 6B. In both cases, the measured voltages $V_O$ and applied voltages $V_I$ show a strong linear relationship, indicating a stable capacitance variation. When the applied voltage is zero, i.e., $V_I=0$ V, the capacitor self-charges to 29.1 V (or 3.8 nC) when the water drop moves from the PTFE surface to CYTOP. This can provide sufficient initial voltage bias for diodes to conduct forward.

The ratio between the measured capacitances, i.e., C/C'=21.31, is much larger than the slope of the linear relationship (17.09) shown in FIG. 6A. This indicates that not all the charge moved along with the water drop when it moved from PTFE to CYTOP. The charge remaining on the surface after the water drop had moved away can be calculated using the measured capacitances and the data shown in FIG. 6A.

Figure 7:
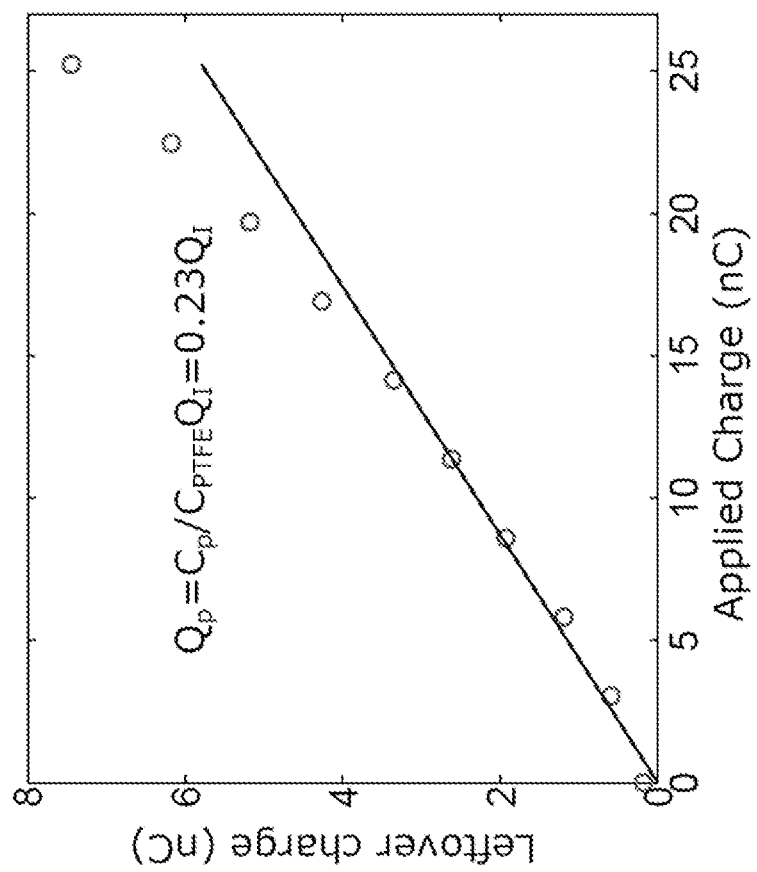
FIG. 7 is a graphical representation of charge remaining on the first region when the conductive droplet moves to the second region as in FIG. 6A.

FIG. 7 is a graphical representation of charge remaining on the first region (PTFE) when the conductive droplet moves to the second region (CYTOP) as in FIG. 6A. Such left-over charge can be modeled using a parasite capacitor connected in parallel to the self-charging variable capacitor. Its value can be calculated to be $C_p$=0.64 nF for the PTFE side. When the applied charge is more than 17 nC, which is equivalent to approximately 6 V of voltage applied to the water drop when it is on PTFE, the parasite capacitance starts to show nonlinearity and increase with the applied charge. Such parasite capacitance for the CYTOP side is negligible because the slope shown in FIG. 6B is the same as the ratio between the two capacitances, i.e., C'/C=0.047.

Taking into account the effect of parasite capacitance and defining $\delta = C_p/C$, the amount of charge in the system follows $$Q_t^{(w)}(i) = \hat{\gamma} Q_t^{(w)}(i-1) + \hat{Q}_\zeta^{(w)}, \hat{\gamma} = \gamma - \gamma_p \quad \text{Equation 2}$$

where $$\gamma_p = \frac{(n-1)\delta\alpha\beta}{(n+\alpha)(n+\beta)}$$

represents the effect of the parasitic capacitance, $$\hat{Q}_\zeta^{(1)} = \frac{n-1}{n+\alpha}\alpha\overline{Q}_{self} - \frac{(n-1)^2(\alpha-\delta\alpha+1)}{(n+\alpha)(n+\beta)}\beta C_0 V_{F1} - \frac{n-1}{n+\alpha}C_0 V_{F2},$$

and $$\hat{Q}_\zeta^{(2)} = -\frac{n(n-1)}{(n+\beta)}\overline{Q}_{self} - \frac{(n-1)^2(1-\delta)\beta}{n+\beta}C_0 V_{F1} - \frac{n(n-1)(1+\beta-\delta\beta)}{(n+\alpha)(n+\beta)}C_0 V_{F2}.$$

In this evaluation, the ratio between the maximum and minimum capacitances of the variable capacitors is kept constant. Under this condition, $\hat{\gamma}$ reaches the maximum value when $\alpha=\beta=\sqrt{C/C'}$. For the prototype devices used in this evaluation, the optimal value of $C_0$ is 0.60 nF and the maximum growth rate is $\hat{\gamma}_{max}=1.33$.

B. Energy Harvesting Performance

Dividing both sides by $C_t^{(w)}$, Equation 2 can be converted into a voltage expression as follows $$V_t^{(w)}(i) = \hat{\gamma} V_t^{(w)}(i-1) + \hat{V}_\zeta^{(w)} \quad \text{Equation 3}$$

where $C_t^{(1)}=C_0+C/2$ and $C_t^{(2)}=C_0+2C'$.

FIG. 8A is a graphical representation of voltage accumulation of an embodiment of the self-charging device in the first configuration and the second configuration. FIG. 8B is a graphical representation of harvested energy of the embodiment of the self-charging device in the first configuration and the second configuration. FIGS. 8A and 8B show the results obtained when the self-charging device is driven by an external excitation. The device was slowly rocked by ±8° so that the two water drops synchronously moved across the junction repetitively. An electrometer is connected to the base capacitor $C_0$ to continuously measure the growth of voltage.

The first cycle started with both water drops on PTFE and the system was in the first configuration with charge neutralized. When water drops moved from PTFE to CYTOP, the second diode $D_2$ and the third diode $D_3$ were turned on due to capacitor self-charging while the first diode $D_1$ was reverse biased. The system was then switched to the second configuration so that charge flew to the base capacitor $C_0$ with the voltage settling at 8 V. The water drops were then driven back towards PTFE. The first diode $D_1$ was turned on due to the charge carried by the water drops while the second diode $D_2$ and the third diode $D_3$ were off due to the reverse bias. The system was switched back to the first configuration with the voltage across the base capacitor $C_0$ settling at 1 V.

Continued excitation of the device created a positive-feedback mechanism, which drove the voltage to 53 V in just a few cycles. The fitted growth rate, $\hat{\gamma}$, is 1.33 when the measured voltages from the first configuration are used. It is 1.30 when the voltages from the second configuration are used. The experimental results agree very well with the theoretical value 1.33. As the electrical potential of variable capacitors on the PTFE side exceeds 6 V, the growth rate starts to reduce due to the nonlinearity and the increase in parasite capacitance. This leads to slower growth of voltages. FIG. 8B shows the harvested energy in the prototype device. The energy increased by 100 times, from 0.027 µJ to 2.7 µJ in the first configuration, within 11 cycles.

Figure 9B:
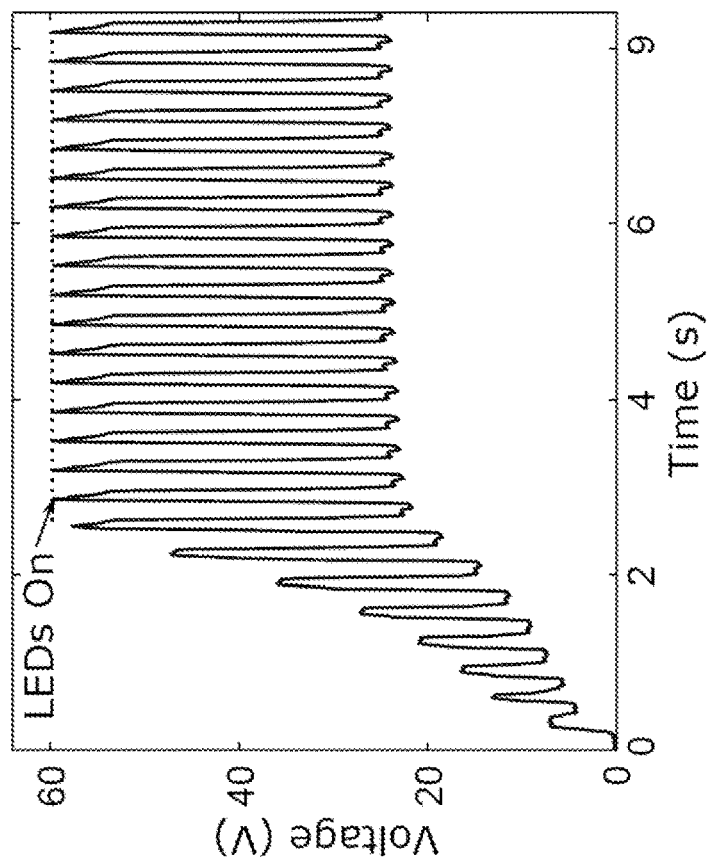
FIG. 9B is a time history of voltages across the base capacitor of the self-charging device of FIG. 9A.
Figure 9A:
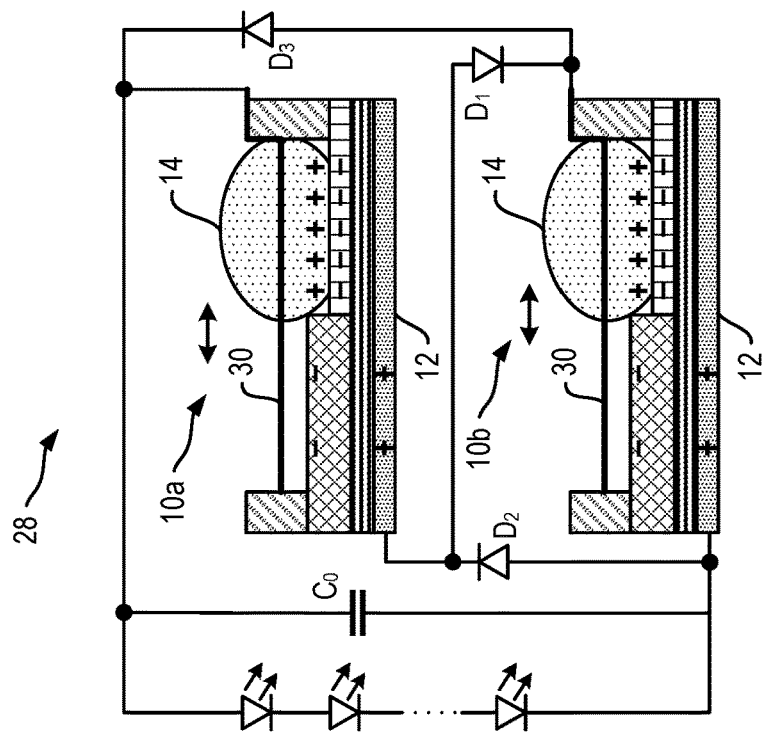
FIG. 9A is a schematic diagram of an embodiment of the self-charging device with two 450 µL water drops illuminating 30 light-emitting diodes (LEDs) connected in series under a 3 Hz vibration.

FIG. 9A is a schematic diagram of an embodiment of the self-charging device 28 with two 450 µL water drops illuminating 30 LEDs connected in series under a 3 hertz (Hz) vibration. FIG. 9B is a time history of voltages across the base capacitor $C_0$ of the self-charging device 28 of FIG. 9A. Such low-frequency vibrations can be found in many human activities, such as walking. After a few seconds, the voltage output reached a sufficiently high value to illuminate 30 green LEDs, as shown in FIG. 9B.

C. Harvesting Energy with Additional Resistive Loads

During the reconfiguration process, electrical currents are generated when charge redistributes among the capacitors. Embodiments of the self-charging device described herein can be used to harvest energy from such flow of charge through a resistive load. For example, a resistive load $R_L$ can be connected between the base capacitor $C_0$ and the variable capacitors.

Figure 10B:
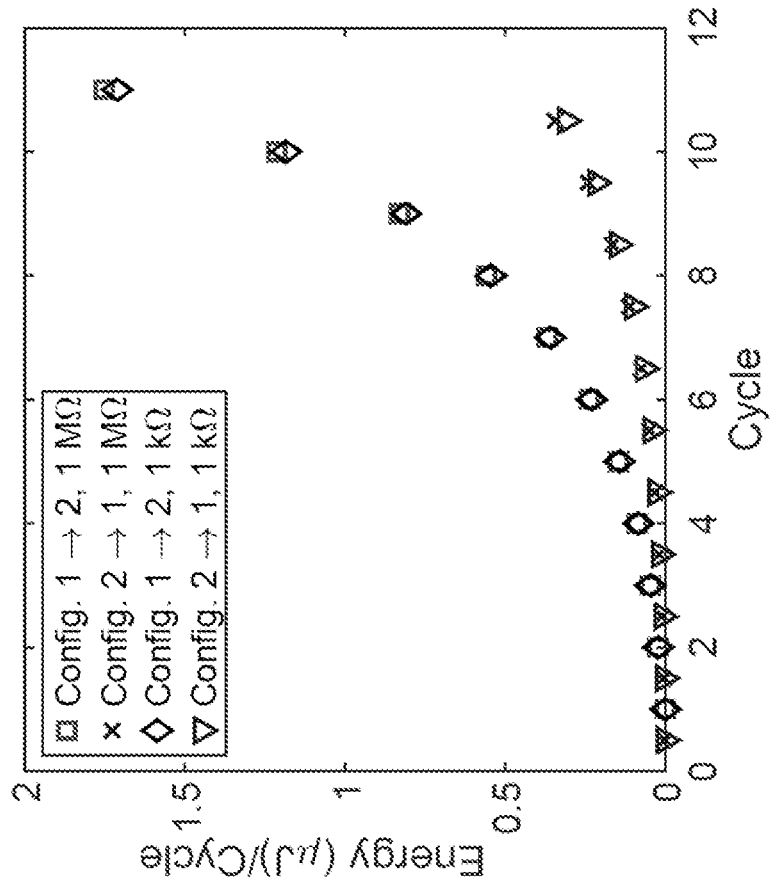
FIG. 10B is a graphical representation of energy harvested per cycle by the self-charging device of FIG. 10A.
Figure 10A:
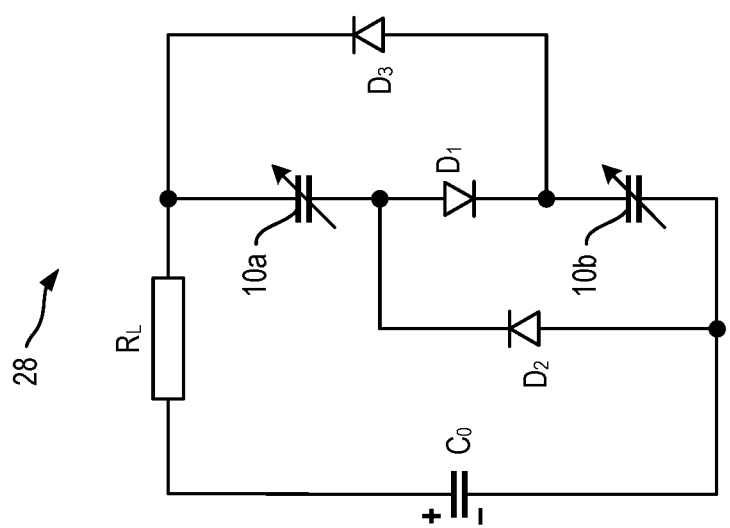
FIG. 10A is an equivalent circuit diagram of an embodiment of the self-charging device used for energy harvesting with a resistive load.

FIG. 10A is an equivalent circuit diagram of an embodiment of the self-charging device 28 used for energy harvesting with a resistive load. FIG. 10B is a graphical representation of energy harvested per cycle by the self-charging device 28 of FIG. 10A. Note that the final state of the device at the end of each reconfiguration process is path independent, therefore, the resistive load does not alter the exponential growth of charge or the energy stored in the device.

Numerical simulations have been conducted with using different levels of resistive load to evaluate the potential of harvesting energy through transient currents. For simplicity, the internal resistance of the device has been assumed to be negligible. The total energy dissipated through the resistive load during a complete reconfiguration process, i.e., the first configuration switching to the second configuration or vice versa, has been calculated through numerical integration. The results obtained respectively with resistive loads of 1 megaohm (MΩ) and 1 kilohm (kΩ) are shown in FIG. 10B. It is seen that the energy harvested through a resistive load grows exponentially with the number of cycles. The harvested energy when the device is switched from the first configuration to the second configuration is significantly more than that from the opposite reconfiguration. The level of resistive load slightly impacts the amount of energy harvested—a higher resistive level yields slightly more energy.

Those skilled in the art will recognize improvements and modifications to the preferred embodiments of the present disclosure. All such improvements and modifications are considered within the scope of the concepts disclosed herein and the claims that follow.

What is claimed is:

1. A self-charging device, comprising:
   a base capacitor;
   a first droplet capacitor;
   a second droplet capacitor, wherein each of the first droplet capacitor and the second droplet capacitor is configured to produce a positive charge in a first state and a negative charge in a second state; and
   solid state switching elements coupling the first droplet capacitor and the second droplet capacitor to the base capacitor such that the positive charge and the negative charge produced by the first droplet capacitor and the second droplet capacitor control the solid state switching elements and charge the base capacitor.

2. The self-charging device of claim 1, wherein the solid state switching elements are configured to place the first droplet capacitor and the second droplet capacitor in series across the base capacitor when the positive charge of each of the first droplet capacitor and the second capacitor exceeds a first threshold.

3. The self-charging device of claim 2, wherein the solid state switching elements are configured to place the first droplet capacitor and the second droplet capacitor in parallel across the base capacitor when the negative charge of each of the first droplet capacitor and the second capacitor exceeds a second threshold.

4. The self-charging device of claim 1, wherein a capacitance of the first droplet capacitor is higher in the first state than in the second state.

5. The self-charging device of claim 1, wherein the solid state switching elements comprise:
   a first switching element coupled between the first droplet capacitor and the second droplet capacitor;
   a second switching element coupled between the first droplet capacitor and the base capacitor; and
   a third switching element coupled between the second droplet capacitor and the base capacitor.

6. The self-charging device of claim 5, wherein in the first state:
   the second switching element and the third switching element are off; and
   the first switching element is turned on if the positive charge exceeds a threshold.

7. The self-charging device of claim 5, wherein in the first state:
   the first switching element is off; and
   the second switching element and the third switching element are turned on if the negative charge exceeds a threshold.

8. The self-charging device of claim 1, further comprising a third droplet capacitor configured to produce a positive charge in the first state and a negative charge in the second state.

9. The self-charging device of claim 8, wherein the solid state switching elements are configured to:
   place the first droplet capacitor, the second droplet capacitor, and the third droplet capacitor in series across the base capacitor in the first state; and
   place the first droplet capacitor, the second droplet capacitor, and the third droplet capacitor in parallel across the base capacitor in the second state.

10. The self-charging device of claim 1, wherein the solid state switching elements comprise one or more diodes.

11. The self-charging device of claim 10, wherein the solid state switching elements comprise:
   a first diode connected between the first droplet capacitor and the second droplet capacitor;
   a second diode coupled between an anode of the first diode and the base capacitor; and
   a third diode coupled between a cathode of the first diode and the base capacitor.

12. The self-charging device of claim 1, wherein the solid state switching elements comprise one or more transistors.

\* \* \* \* \*